US00RE45143E

(19) United States
(12) Reissued Patent
Mullen

(10) Patent Number: US RE45,143 E
(45) Date of Reissued Patent: Sep. 23, 2014

(54) APPARATUS FOR EQUALIZING VOLTAGE ACROSS AN ELECTRICAL LIGHTING SYSTEM

(75) Inventor: Nate Mullen, Escondido, CA (US)

(73) Assignee: The Toro Company, Bloomington, MN (US)

(21) Appl. No.: 13/552,322

(22) Filed: Jul. 18, 2012

Related U.S. Patent Documents

Reissue of:
(64) Patent No.: 8,006,375
Issued: Aug. 30, 2011
Appl. No.: 10/382,763
Filed: Mar. 6, 2003

U.S. Applications:
(62) Division of application No. 09/738,024, filed on Dec. 14, 2000, now Pat. No. 7,699,481.

(51) Int. Cl.
*H01R 43/00* (2006.01)

(52) U.S. Cl.
USPC ..... 29/825; 29/827; 29/830; 29/831; 29/832; 362/365

(58) Field of Classification Search
USPC ..... 29/592.1, 747, 825, 827, 830–832; 315/276, 323, 360–362; 362/84, 153, 362/153.1, 364, 365; 361/38
See application file for complete search history.

(56) References Cited

U.S. PATENT DOCUMENTS 2,144,931 A 1/1939 Poey
2,252,395 A 8/1941 Cohen
2,481,531 A 9/1949 Phillips
3,231,731 A 1/1966 McDonald
3,235,771 A 2/1966 Schwartz
4,161,021 A 7/1979 George, Jr.
4,462,066 A 7/1984 Gibson et al.
4,724,282 A 2/1988 Troder
4,858,877 A 8/1989 Carter
4,884,178 A 11/1989 Roberts
4,983,307 A 1/1991 Nesathurai
4,984,139 A 1/1991 Goggia
4,996,636 A 2/1991 Lovett
4,998,042 A 3/1991 Schilling, Jr.
5,027,262 A 6/1991 Freed
5,086,379 A 2/1992 Denison et al.
5,113,325 A 5/1992 Eisenbraun
5,156,454 A * 10/1992 White ..... 362/153
5,165,778 A 11/1992 Matthias et al.
5,280,417 A 1/1994 Hall et al.
5,291,299 A * 3/1994 Karna ..... 315/323
5,349,508 A 9/1994 Karbaf
5,567,045 A 10/1996 Bucek
5,601,448 A 2/1997 Poon
5,634,820 A 6/1997 Vakil
5,917,288 A 6/1999 Feldman et al.
5,962,982 A 10/1999 Mancuso (Continued)

*Primary Examiner* — Donghai D Nguyen
(74) *Attorney, Agent, or Firm* — Inskeep IP Group, Inc.

(57) ABSTRACT

An apparatus for equalizing voltage across an electrical lighting system, particularly in low voltage landscape lighting systems. The apparatus consists of a plastic cylinder having open ends and containing two or more connectors for connecting a homerun wire from a transformer to wire leads from the various light fixtures in the lighting system. The wire leads are of uniform length to ensure that each light fixture is [ecu] *equally* distant from the transformer.

8 Claims, 7 Drawing Sheets

(56) References Cited

U.S. PATENT DOCUMENTS

| | | | | |
|---|---|---|---|---|
| 6,386,729 | B1 | 5/2002 | Bober | |
| 6,502,967 | B2 | 1/2003 | Mullen | |
| 6,755,557 | B2 | 6/2004 | Stauner et al. | |
| 2003/0156367 | A1 * | 8/2003 | Macbeth | 361/38 |

* cited by examiner

DAISY CHAIN

Amended

LOOP METHOD

Amended

"T" METHOD

Amended

Amended

APPARATUS FOR EQUALIZING VOLTAGE ACROSS AN ELECTRICAL LIGHTING SYSTEM

Matter enclosed in heavy brackets [ ] appears in the original patent but forms no part of this reissue specification; matter printed in italics indicates the additions made by reissue.

CROSS-REFERENCE TO RELATED APPLICATION

This application is a divisional application, pursuant to 37 CFR 1.60, based upon and claiming the benefit of U.S. application Ser. No. 09/738,024, filed Dec. 14, 2000 now U.S. Pat. No. 7,699,481.

STATEMENT RE: FEDERALLY SPONSORED RESEARCH AND DEVELOPMENT

Not Applicable.

BACKGROUND OF THE INVENTION

1. Field of the Invention

This invention relates to a wiring method and an apparatus used therein to equalize voltage drop across a lighting system. The method and apparatus is particularly applicable to low voltage lighting systems. As this invention was developed for use in low voltage systems, this specification will discuss the invention as applied to low voltage systems. However, the principles and teachings of this invention are applicable to both standard and high voltage systems as well.

2. Description of the Related Art

The prior art discloses several methods and manners for wiring lighting systems to compensate for voltage drop across a system. The most common method is the Daisy Chain method which simply has each light fixture run in series from the power source. This method results in a voltage drop at each fixture and across the wiring in between. At the end of a series of fixtures, the voltage drop across a Daisy Chain system may be very large at low voltages.

Another wiring method is the Loop Method which is basically a Daisy Chain run with an extra loop of wire between the first fixture and the last fixture. The loop of wire brings the same voltage and power to both ends of the wire run. The voltage drop across the fixtures decreases only up to the mid-point of the Daisy Chain run rather than the entire length.

Another wiring method is the "T" Method. The "T" Method has the homerun wire running to a central fixture and the other fixtures are wired in series from the central fixture. This method lessens the voltage drop because the runs are shorter than in the Daisy Chain or Loop Methods for the same number of fixtures. This method may also be combined with other methods such as the Loop Method.

Drawbacks of the prior art methods include excessive voltage drop or the use of extra parts, labor and time to minimize the voltage drop. Because of the voltage drop in the above methods, lighting systems which are wired using these methods present lights that are each receiving a different voltage resulting in lights with inconsistent light output.

BRIEF SUMMARY OF THE INVENTION

The main object of this invention is to provide a wiring method which equalizes voltage across a lighting system while minimizing parts, labor and time spent.

It is another object of this invention to provide a wiring method which provides better wiring connections for landscape lighting, i.e., connections are not in the ground where they are exposed to oxidation and rust but are contained in an Equalizer Hub™.

The Equalizer Hub™ is a wiring manifold that distributes voltage evenly to each lamp in a given lighting system, even if one or more light fixtures fail. The Equalizer Hub™ is designed to be used in conjunction with one or more lighting fixtures, and serves as the connection point between the homerun wire from the power source, i.e. a transformer, and the fixture lead wires. The Equalizer Hub™ may be used in all applications, particularly low voltage landscape lighting, and it may be buried above or below grade. While, the Equalizer Hub™ may be used in all applications, it is most effective in low voltage situations where the amount of voltage drop in a system will have a greater effect on the light output by the individual fixtures.

Other advantages and benefits of the present invention include ease in adding fixtures to a system, easy in testing voltage, ease in troubleshooting, easy access to wire connections, and ease in moving fixtures.

DETAILED DESCRIPTION OF THE INVENTION

The instant invention is directed to a wiring method used for equalizing voltage delivered to each fixture in a lighting system. Primarily, the wiring method of the instant invention is intended for use in low voltage landscape lighting systems, however, the principles and methods are equally applicable to standard and high voltage systems. The benefits of this invention are more realizable in low voltage systems where the voltage drop over a given distance will cause a noticeable decrease in performance of the lighting system.

The novel designs of the present invention address the shortcomings of prior art outdoor wiring systems, namely, by providing: (i) a wiring method that saves on parts, labor and time in installation; (ii) a wiring method that results in lighting systems that do not experience a voltage drop that reduces performance; (iii) a wiring method that allows for easy addition of lighting fixtures to an existing lighting system; and (iv) a wiring method that may be used to combine various types of light fixtures into one lighting system without worrying about different types of fixtures causing different amounts of voltage drop across the line.

FIGS. 1a, 1b, 1c, and 1d depict representations of various prior art wiring methods used to connect light fixtures in a given lighting system. As discussed above, each of these wiring methods result in an increasing voltage drop from the first fixture in the lighting system to each fixture down the run.

Referring to the prior art methods in FIGS. 1a, 1b, 1c, and 1d, each lamp is not a uniform length of wire from the transformer, and hence, each lamp experiences a different amount of voltage drop. In addition, in the prior art methods, each lamp in series from the transformer experiences an additional voltage drop because of the additional connections and fixtures that the electricity passes through prior to reaching the intended fixture.

The preferred embodiment of the wiring method of the present invention will be described using 12/2 or 16/2 electrical line where appropriate. A person having ordinary skill in the art will realize the differences and benefits between using 16/2 or 12/2 electrical line or wire of another gauge or an electrical line with more wires and be able to choose the appropriate type and gauge of wire.

Figure 1A:
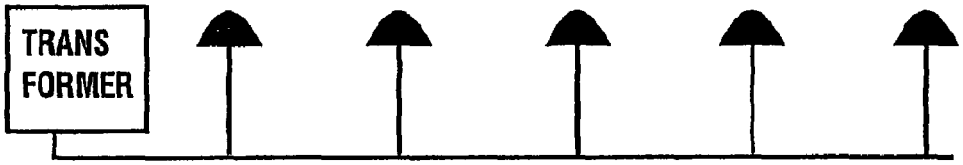
FIGURE 1a Prior Art
FIG. 1a depicts a representation of the prior art Daisy Chain wiring method.
Figure 1B:
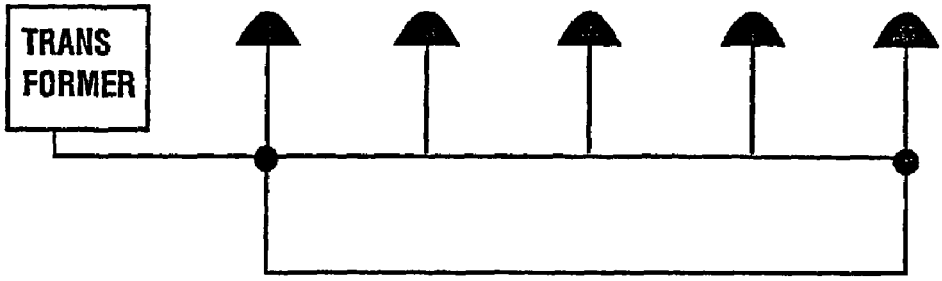
FIGURE 1b Prior Art
FIG. 1b depicts a representation of the prior art Loop wiring method.
Figure 1C:
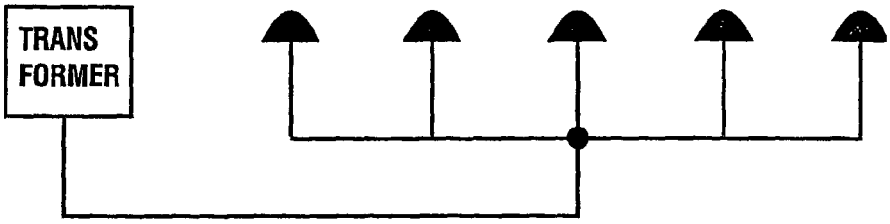
FIGURE 1c Prior Art
FIG. 1c depicts a representation of the prior art "T" wiring method.
Figure 1D:
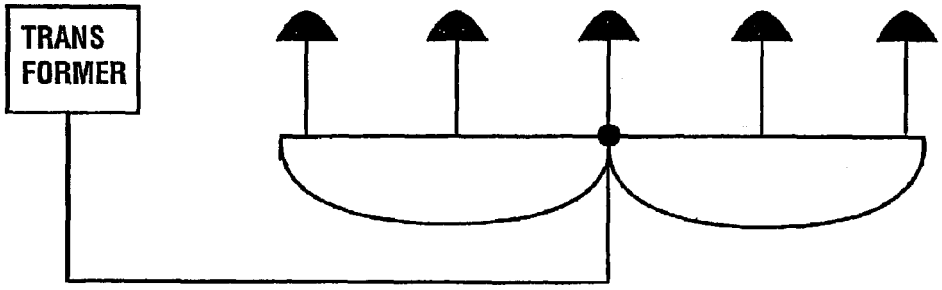
FIGURE 1d Prior Art
FIG. 1d depicts a representation of the prior art combined "T" and Loop wiring method.
Figure 2:
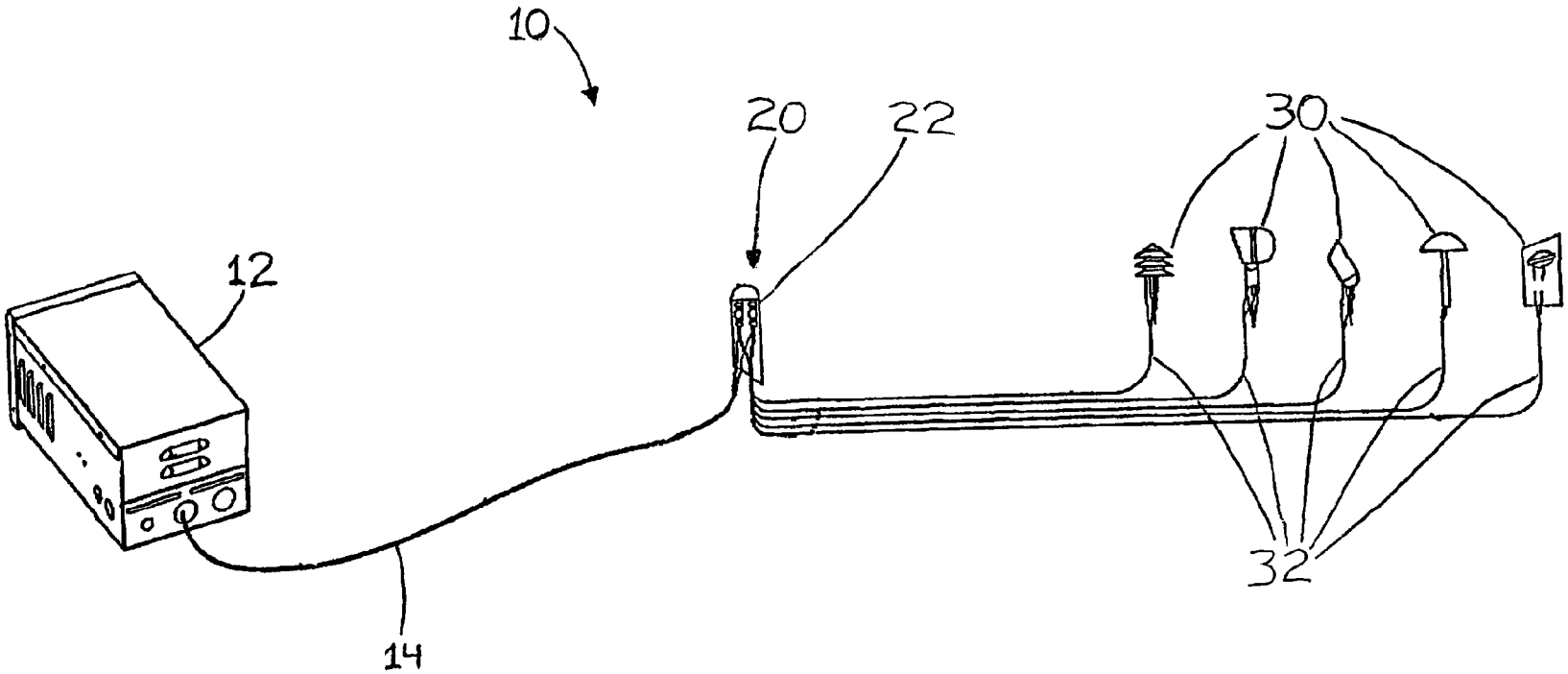
FIG. 2 depicts a representation of the wiring method of the present invention.

As depicted in FIG. 2, the wiring method for a given lighting system (10) connects a power source (not shown) to a transformer (12), with a homerun wire (14). The homerun wire (14) is connected to two or more connectors (22) in the Equalizer Hub™ (20). The connectors (22) in the Equalizer Hub™ (20) may be any appropriate type of electrical connector, i.e. barrel-lug, screw on electrical connector typically sold under the trademark WIRE-NUT®, permanent solder connection, etc. A skilled artisan will recognize the advantages and disadvantages of using the various types of wire connectors. The preferred embodiment of the present invention uses barrel-lug connectors with threaded ends for securing in a screw on electrical connector typically sold under the trademark WIRE-NUT® containing insulating grease.

Figure 3:
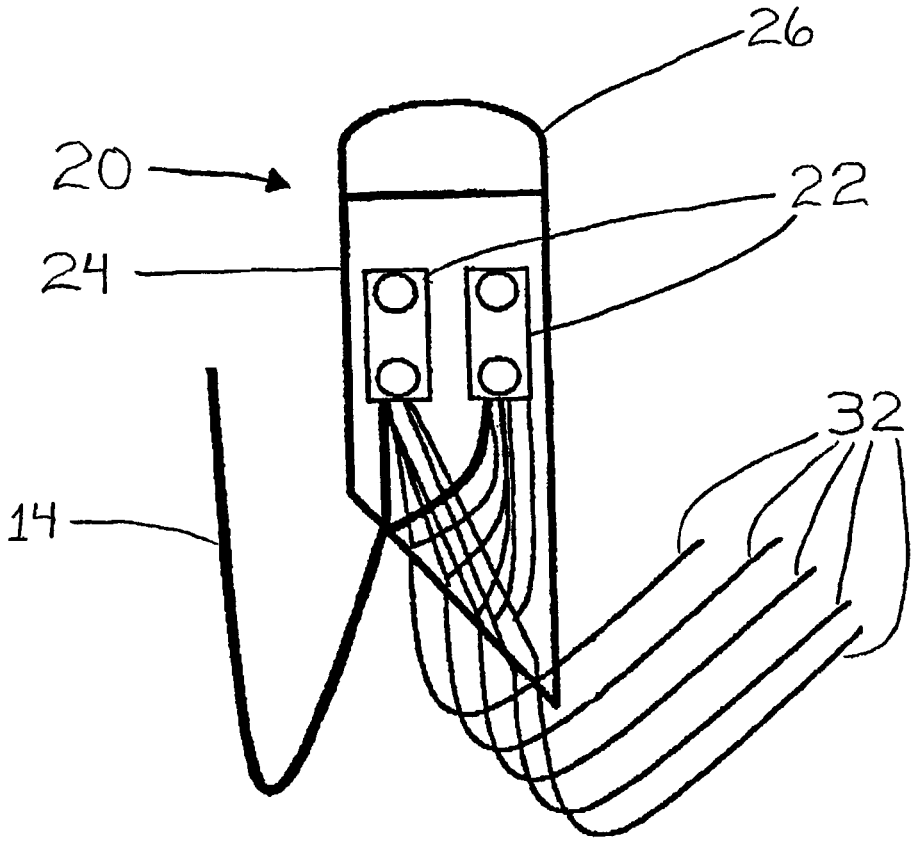
FIG. 3 shows an enlarged, cut-away side view of the Equalizer Hub™ with homerun and wire lead connections.

As further shown in FIG. 2, each of the lighting fixtures (30) are directly coupled to the homerun wire (14) without passing through another connection or fixture. The fixtures (30) are coupled to the homerun wire (14) by running wires leads (32) from the fixtures (30) to the connectors (22) in the Equalizer Hub™ (20). This feature is more clearly shown in FIGS. 3 and 4, which are close-up views of the Equalizer Hub™ (20) with incoming homerun (14) and lead (32) wires coupled with the connectors (22).

In the present invention, the wire leads (32) are of equal lengths so that each fixture (30) is an equal distance from the transformer (12). A skilled artisan will recognize that the homerun wire (14) and the wire leads (32) should be coupled with the connectors (22) in such a way to allow the homerun wire (14) and the wire leads (32) to be connected with matching polarities.

The equal distance of each fixture (30) from the transformer (12) results in equal voltage drop between the transformer (12) to the fixture (30). The only available source of voltage drop is the electrical wire itself, the electricity to each fixture (30) does not pass through any additional connections, fixtures or other sources of voltage drop prior to arriving at the intended fixture (30). Since the only source of voltage drop is the wire itself and each fixture (30) is an equal length of wire from the transformer (12), the amount of voltage drop will be uniform.

A skilled artisan will recognize that even given the present invention, there are limitations on the length of wire runs and the number of fixtures or total amount of wattage which may be attached to a given lighting system. Extremely long wire runs inherently experience a high level of voltage drop. In addition, a lighting system which has too many fixtures or a total wattage that is too high will not function properly.

In the preferred embodiment of the present invention, runs of 12/2 electrical wire from the equalizer hub to any fixture should be limited to 50 feet. If an artisan uses 16/2 electrical wire, similar runs from the equalizer hub to any fixture should be limited to 25 feet. This is not to say that runs cannot be of greater lengths, but, as the length increases, the amount of voltage drop across the line increases and the benefits gained by the use of the inventive method begin to decrease.

Similarly, in the preferred embodiment of the present invention, the number of fixtures on a given equalizer hub should be limited to 4 or 5. However, a greater number of fixtures may be used depending upon the total wattage of the fixtures and any potential or intended increases in wattage in the future. The inventor has found that the use of 4 or 5 fixtures at installation are adequate for allowing the future addition of new fixtures to a hub while maximizing effectiveness at installation.

Figure 4:
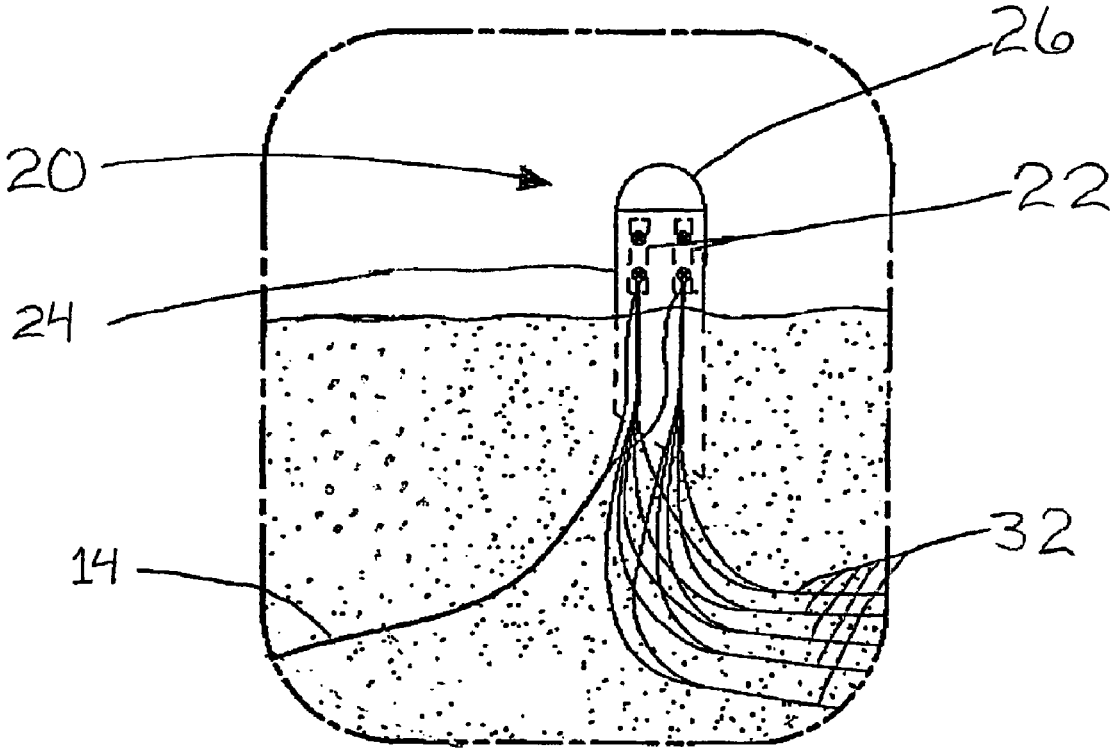
FIG. 4 shows a cut-away side view of the Equalizer Hub™ with homerun and wire lead connections in relation to ground level.

FIG. 4 depicts the Equalizer Hub™ (20) with incoming homerun (14) and wires lead (32) coupled with the connectors (22). The Equalizer [Hum] *Hub*™ (20) in this figure is depicted as installed and in use above grade. As an artisan will recognize, the Equalizer Hub™ (20) may be installed above grade or below grade. The Equalizer Hub™ (20) consists of a cylindrical member (24) with a cap (26) covering the top of the cylindrical member (24). The cylindrical member (24) and cap (26) may be constructed of any material commonly used for containing electrical connections, i.e. plastic, metal, ceramic, etc. In the preferred embodiment, the cylindrical member (24) and cap (26) are manufactured from black [ABS] *acrylonitrile butadiene styrene* (*ABS*) plumbing pipe. This material provides a secure environment for the connections when made in a landscape lighting system. The plumbing pipe remains water-tight in an outdoor environment and the black color is aesthetically pleasing and easily concealed under a plant or in a bed of mulch or dirt.

The above described invention is capable of being used in nearly any lighting system, whether it is high, standard or low voltage, or whether it is indoor or outdoor lighting. A skilled artisan will recognize that this invention may be used on its own or in combination with any of the other prior art embodiments in various lighting systems.

The above-described preferred embodiments are intended to illustrate the principles of the invention, but not to limit its scope. Other embodiments and variations of these preferred embodiments will be apparent to those skilled in the art and may be made without departing from the spirit and scope of the invention as defined in the following claims.

I claim:

1. An apparatus for equalizing voltage drop across a plurality of outdoor, electrical light fixtures in an outdoor electrical lighting system, comprising:

a transformer having a homerun wire providing electricity;

leadwires on each of the plurality of light fixtures, wherein the leadwires on one of the light fixtures are of an equal length as the leadwires of the other light fixtures; and a hollow[, cylindrical] member [having an open bottom and] enclosing wire connectors for connecting the homerun wire directly to only the leadwires such that each of the plurality of light fixtures is an equal distance of electrical wire from the transformer and has an equal number of electrical connections therebetween;

*wherein all of the leadwires have the same length and wherein each of the leadwires connect between only one of the light fixtures and the wire connectors in the hollow member.*

2. The apparatus of claim 1, wherein the electricity provided by the transformer is low voltage electricity.

3. The apparatus of claim 2, wherein said plurality of light fixtures are low voltage light fixtures.

4. The apparatus of claim 1, wherein the hollow [cylindrical] member is made from a material selected from the group consisting of plastic, metal and ceramic.

5. The apparatus of claim 4, wherein the hollow [cylindrical] member is made from a rigid plastic.

6. The apparatus of claim 5, wherein the hollow [cylindrical] member is made from black [ABS] *acrylonitrile butadiene styrene* plumbing pipe.

7. The apparatus of claim 1, wherein a portion of the hollow [cylindrical] member is below ground level and wherein the homerun wire and leadwires enter the hollow cylindrical member through [the] *an* open bottom.

8. The apparatus of claim 1, wherein said outdoor electrical lighting system is a landscape electrical lighting system and said plurality of light fixtures are landscape light fixtures.

* * * * *